United States Patent
Teshima et al.

(10) Patent No.: US 9,635,709 B2
(45) Date of Patent: Apr. 25, 2017

(54) ELECTRONIC DEVICE

(71) Applicant: KABUSHIKI KAISHA TOSHIBA, Minato-ku, Tokyo (JP)

(72) Inventors: Masao Teshima, Tokyo (JP); Akihiro Tsujimura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/932,179

(22) Filed: Nov. 4, 2015

(65) Prior Publication Data
US 2016/0353520 A1    Dec. 1, 2016

Related U.S. Application Data

(60) Provisional application No. 62/167,632, filed on May 28, 2015.

(51) Int. Cl.
*H04M 1/00*    (2006.01)
*H04W 88/06*   (2009.01)
*H04L 29/06*   (2006.01)
*H04W 12/06*   (2009.01)

(52) U.S. Cl.
CPC ......... *H04W 88/06* (2013.01); *H04L 63/0853* (2013.01); *H04W 12/06* (2013.01)

(58) Field of Classification Search
CPC ............... H04L 63/0853; H04L 9/3268; H04L 63/0869; H04L 9/3273; H04L 9/0877; H04L 25/0272; H04L 65/1069; H04M 1/6066; H04M 2250/02; H04M 1/6033; H04M 1/7253; G06Q 20/3674; G06Q 20/382; G06Q 20/4037
See application file for complete search history.

(56) References Cited

U.S. PATENT DOCUMENTS

| | | | |
|---|---|---|---|
| 2008/0248834 A1* | 10/2008 | Chatterjee | G06F 3/1415 455/557 |
| 2012/0215931 A1* | 8/2012 | Touati | H04L 63/162 709/229 |
| 2013/0258924 A1 | 10/2013 | Imamura et al. | |

FOREIGN PATENT DOCUMENTS

| JP | 2012-029021 A | 2/2012 |
|---|---|---|
| JP | 2013-214837 A | 10/2013 |

\* cited by examiner

*Primary Examiner* — Kwasi Karikari
(74) *Attorney, Agent, or Firm* — Foley & Lardner LLP

(57) ABSTRACT

According to one embodiment, an electronic device is set, when authentication processing using an output identification data is executed by a communication device and when authentication by the authentication processing succeeds, to a state of being able to perform a communication with a narrow-area cellular base station, and the state of being able to perform a communication is maintained even after the communication device is detached from the electronic device.

3 Claims, 8 Drawing Sheets

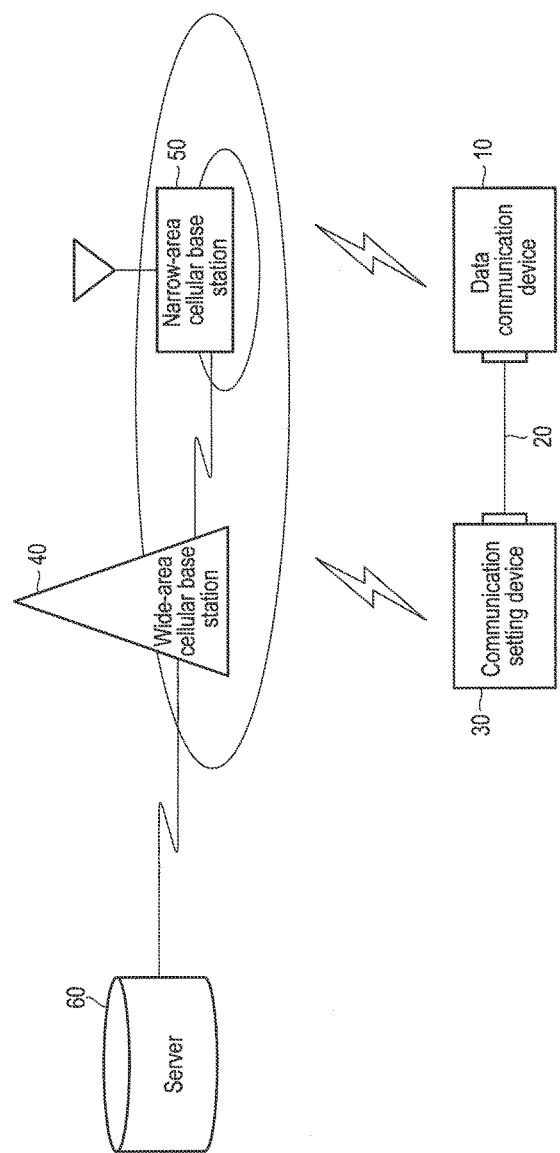
F I G. 1

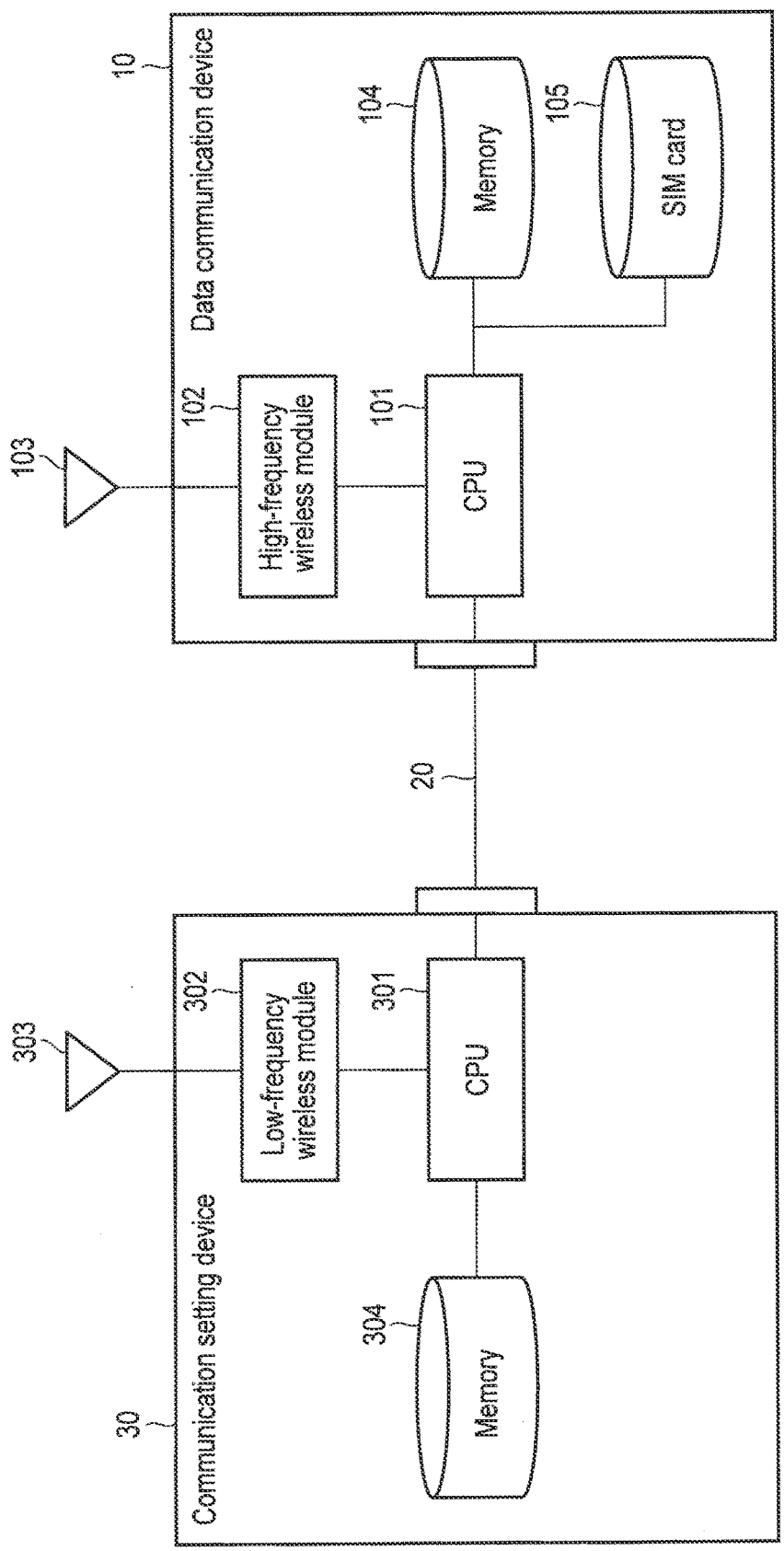
F I G. 2

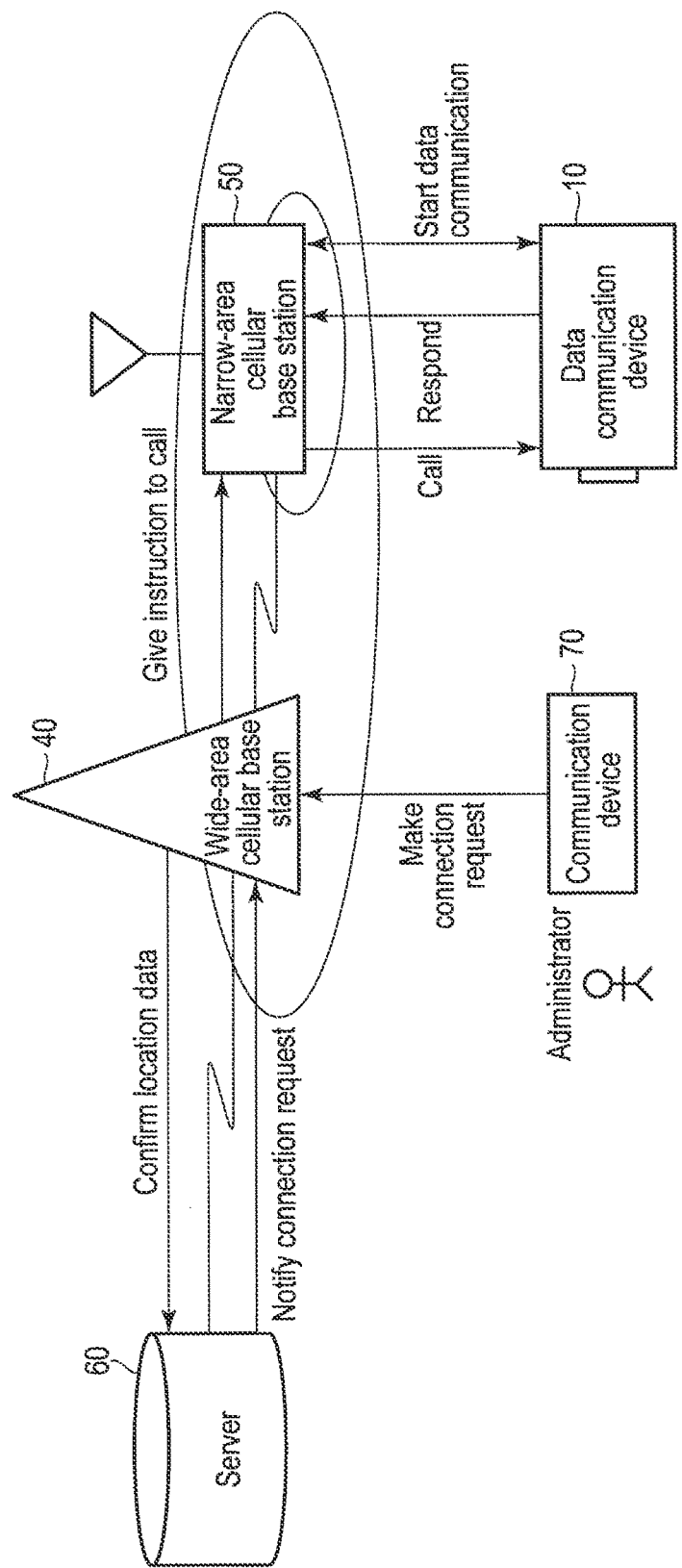
F I G. 5

ELECTRONIC DEVICE

CROSS-REFERENCE TO RELATED APPLICATIONS

This application claims the benefit of U.S. Provisional Application No. 62/167,632, filed May 28, 2015, the entire contents of which are incorporated herein by reference.

FIELD

Embodiments described herein relate generally to an electronic device.

BACKGROUND

Recently, as an alternative to a 4G cellular system represented by Long-Term Evolution (LTE) or the like, a 5G cellular system has come under consideration. In the 5G cellular system, a new wireless communication system is to be adopted in addition to LTE, and these two systems are to be used in combination. The new wireless communication system is to use a frequency band higher than that used for LTE in order to realize high-speed wireless communication.

However, in adopting a new wireless communication system to realize the 5G cellular system, a wireless communication device conforming to the 5G cellular system must include a function (circuit) conforming to LTE as well as a function (circuit) conforming to the new wireless communication system. This may lead to various inconveniences such as increases in the circuit scale (device size), the power consumption of the wireless communication device and the manufacturing cost of the wireless communication device.

Therefore, there are demands for a new technique which can resolve the above-described inconveniences.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 illustrates an example of the structure of a communication system which includes an electronic device of an embodiment.

FIG. 2 illustrates an example of the structures of an electronic device and another electronic device of the embodiment.

FIG. 5 is a supplementary explanatory diagram showing an example of the procedure of data communication processing of the embodiment.

DETAILED DESCRIPTION

Figure 3:
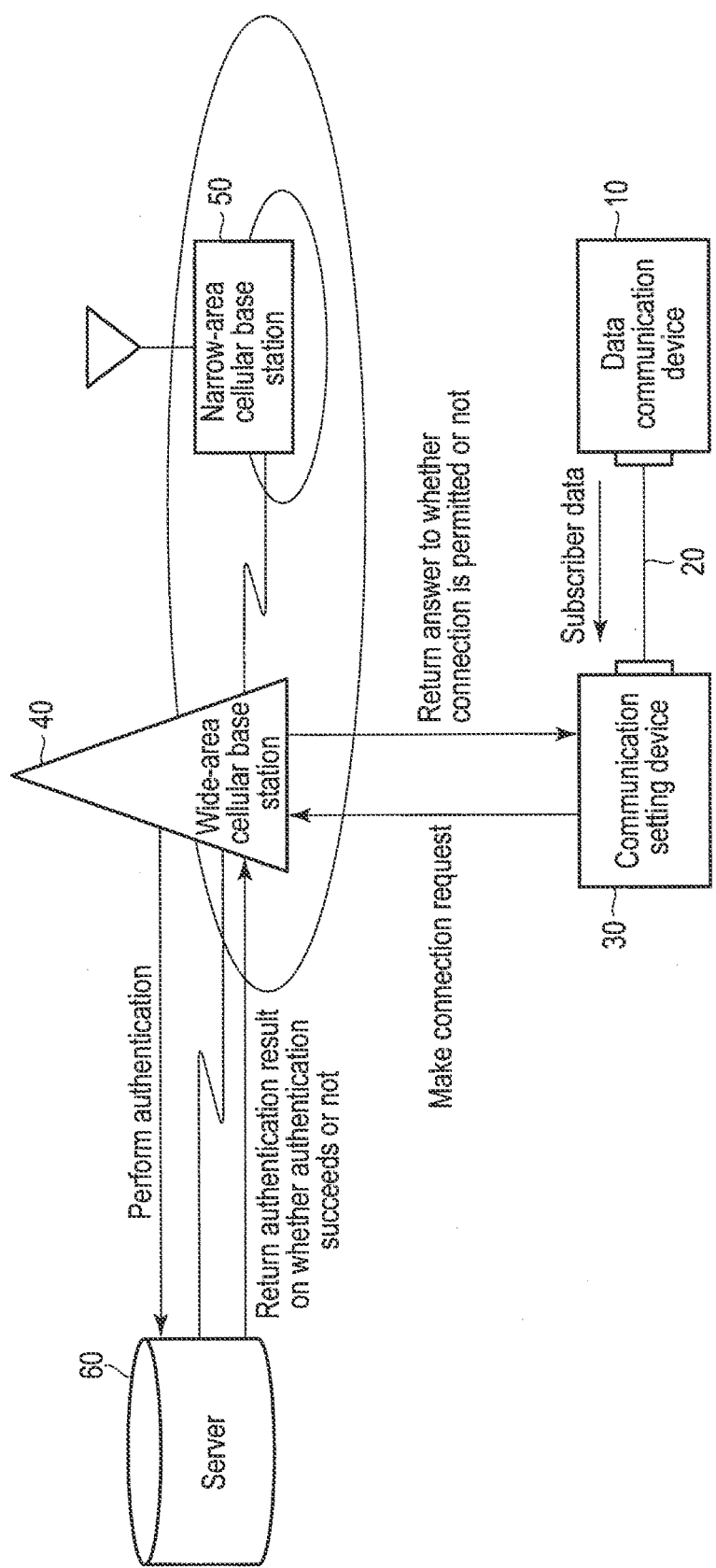
FIG. 3 is a supplementary explanatory diagram showing an example of the procedure of communication setting processing of the embodiment.

Various embodiments will be described hereinafter with reference to the accompanying drawings.

In general, according to one embodiment, an electronic device is included in a communication system which further includes a server configured to store identification data for identifying the electronic device and a communication device configured to communicate with a wide-area cellular base station conforming to a low frequency band, and the electronic device is detachably connected to the communication device and configured to perform a communicate with a narrow-area cellular base station which is different from the wide-area cellular base station and is conforming to a high frequency band. The electronic device includes: a memory configured to store the identification data; and circuitry coupled to the memory and configured to output the stored identification data to the communication device when the communication device is connected to the electronic device, wherein the electronic device is set, when authentication processing using the output identification data is executed by the communication device and when authentication by the authentication processing succeeds, to a state of being able to perform a communication with the narrow-area cellular base station, and the state of being able to perform a communication is maintained even after the communication device is detached from the electronic device.

FIG. 1 illustrates an example of the structure of a communication system including an electronic device of an embodiment. The communication system includes, as shown in FIG. 1, an electronic device 10, another electronic device 30 detachably connected to the electronic device 10 via a connector (or a cable, or a NFC connection) 20, a wide-area cellular base station (macrocell base station) 40, a narrow-area cellular base station (small cell base station) 50, and a server (home memory) 60. Hereinafter, the electronic device 10 will be referred to as a data communication device, and the other electronic device 30 will be referred to as a communication setting device. Note that the data communication device 10 is a communication device conforming to 5G cellular systems and that the communication setting device 30 is a communication device conforming to 4G cellular systems.

FIG. 2 illustrates an example of the structures of the data communication device 10 and the communication setting device 30 of the embodiment. The data communication device 10 is an Internet of Things (IoT) device, and includes, for example, security cameras, vending machines and the like. In the present embodiment, the data communication device 10 is assumed to be a communication device installed fixedly in a given place. The data communication device 10 is a communication device including a function of performing wireless communication with the narrow-area cellular base station 50. The data communication device 10 includes, as shown in FIG. 2, a CPU 101, a high-frequency wireless module 102, a high-frequency antenna 103, a memory 104 and a subscriber identity module (SIM) card 105, and the like.

The CPU 101 is a processor configured to control operations of various modules in the data communication device 10. The processor includes at least one processing circuit.

The high-frequency wireless module 102 includes a baseband processor and a frequency converter. The baseband processor is configured to execute encoding or decoding processing, modulating or demodulating processing, and the like of data transmitted or received. The frequency converter is configured to convert the frequency of an encoded and modulated, transmitted baseband signal into the frequency of a wireless signal corresponding to a wireless channel. The frequency converter is configured to convert the frequency of a received wireless signal into the frequency of a received baseband signal. To the high-frequency wireless module 102, the high-frequency antenna 103 is connected via a feed. The high-frequency antenna 103 is an antenna configured to transmit or receive a wireless signal used in 5G cellular systems, that is, an antenna conforming to a high-frequency band.

The memory 104 is configured to store various kinds of data collected in the data communication device 10. For example, in a case where the data communication device 10 is a security camera, video data or the like recorded in the security camera is stored therein. Further, in a case where the data communication device 10 is a vending machine, sales data or the like in the vending machine is stored therein. The SIM card 105 is a storage device configured to store at least subscriber data. The subscriber data is identification data assigned in advance to uniquely identify the data communication device 10.

The communication setting device 30 is a communication device to be connected to the data communication device 10 via the connector 20 at the time of installation of the data communication device 10. The communication setting device 30 includes a function of performing wireless communication with the wide-area cellular base station 40. The communication setting device 30 includes, as shown in FIG. 2, a CPU 301, a low-frequency wireless module 302, a low-frequency antenna 303, a memory 304, and the like.

The CPU 301 is a processor configured to control operations of various modules in the communication setting device 30. The processor includes at least one processing circuit.

The low-frequency wireless module 302 includes a baseband processor and a frequency converter in a manner similar to that of the above-described high-frequency wireless module 102. The baseband processor is configured to execute encoding or decoding processing, modulating or demodulating processing, and the like of data transmitted or received. The frequency converter is configured to convert the frequency of an encoded and modulated, transmitted baseband signal into the frequency of a wireless signal corresponding to a wireless channel. The frequency converter is configured to convert the frequency of a received wireless signal into the frequency of a received baseband signal. To the low-frequency wireless module 302, the low-frequency antenna 303 is connected via a feed. The low-frequency antenna 303 is an antenna configured to transmit or receive a wireless signal used in 4G cellular systems, that is, an antenna conforming to a low-frequency band.

The memory 304 is configured to temporarily store subscriber data or the like obtained from the data communication device 10 as will be described later.

Note that each of the data communication device 10 and the communication setting device 30 includes a connecting portion into which the connector 20 is inserted.

The wide-area cellular base station 40 is a base station which can perform wireless communication with a communication device conforming to 4G cellular systems (for example, the communication setting device 30) and the wireless communication range (cell) of which is wide. More specifically, the wide-area cellular base station 40 is a base station configured to perform wireless communication with a communication device conforming to 4G cellular systems included within the range of a few hundred meters to a few kilometers from the wide-area cellular base station 40. On the other hand, the narrow-area cellular base station 50 is a base station which can perform wireless communication with a communication device conforming to 5G cellular systems (for example, the data communication device 10) and the wireless communication range (cell) of which is narrow. More specifically, the narrow-area cellular base station 50 is a base station configured to perform wireless communication with a communication device conforming to 5G cellular systems included within the range of dozens of meters to a few hundred meters from the narrow-area cellular base station 50.

The server 60 is a storage device configured to store registration data in which subscriber data and location data are associated with each other. Since the subscriber data has been described above, detailed description thereof will be omitted. The location data indicates the installation location of the data communication device 10.

Here, with reference to FIGS. 3 and 4, an example of the procedure of communication setting processing to be executed in the communication system of FIG. 3 at the time of installation of the data communication device 10 will be described. The following passages describe the procedure of processing to be executed after the data communication device 10 is installed in a given place and the communication setting device 30 is detachably connected to the data communication device 10 via the connector 20. Further, the following description is based also on the assumption that the server 60 stores at least subscriber data unique to the data communication device 10.

First, when the communication setting device 30 is detachably connected to the data communication device 10 via the connector 20, processing to obtain the subscriber data from the SIM card 105 through a SIM card slot provided in the data communication device 10 is executed (block B1). The obtained subscriber data is temporarily stored in the memory 304 provided in the communication setting device 30. Note that the communication setting device 30 also obtains the location data indicating the installation location of the data communication device 10. The location data is assumed to be, for example, collected by a Global Positioning System (GPS) function of a location measurement unit (not shown) provided in the data communication device 10 and stored in the memory 104 in advance. Alternatively, it is also possible to regard the current location of the communication setting device 30 as a location substantially the same as the installation location of the data communication device 10. In that case, the location data is collected, for example, by a GPS function of a location measurement unit (not shown) provided in the communication setting device 30.

After obtaining the subscriber data unique to the data communication device 10, the communication setting device 30 transmits the installation data indicating the installation location of the data communication device 10 and the obtained subscriber data to the wide-area base station 40 via the low-frequency wireless module 302 and the low-frequency antenna 303 (block B2). That is, by transmitting the location data and the obtained subscriber data to the wide-area cellular base station 40, the communication setting device 30 makes a connection request to enable a communication between the data communication device 10 and the narrow-area cellular base station 50.

When receiving the connection request from the communication setting device 30, the wide-area cellular base station 40 executes processing (authentication processing) to inquire the server 60 whether registration data including the subscriber data transmitted as a connection request has been registered in the server 60 or not (block B3).

If the server 60 responds to the above-described inquiry that registration data including the subscriber data transmitted from the communication setting device 30 as a connection request has been registered therein (YES in block B3), the wide-area cellular base station 40 executes processing to register the location data transmitted from the communication setting device 30 as a connection request in the server 60 in association with the subscriber data (block B4). Note that the above-described processing of block B4 will not be executed in a case where the location data transmitted from the communication setting device 30 as a connection request has already been registered in the server 60 in association with the subscriber data included in the connection request, and processing proceeds to block B5, which will be described later.

Then, the wide-area cellular base station 40 outputs to the communication setting device 30 a notification of permission of a communication between the data communication device 10 and the narrow-area cellular base station 50 (block B5).

When receiving the notification of permission of a communication between the data communication device 10 and the narrow-area cellular base station 50 via the low-frequency antenna 303 and the low-frequency wireless module 302, the communication setting device 30 displays on a display (not shown) provided in the communication setting device 30 that the communication setting (initial setting) to be performed at the time of installation of the data communication setting device 10 has ended normally, and then processing ends.

On the other hand, if the server 60 responds to the above-described inquiry that the registration data including the subscriber data transmitted from the communication setting device 30 as a connection request has not been registered therein (NO in block B3), the wide-area cellular base station 40 outputs to the communication setting device 30 a notification of rejection of a communication between the data communication device 10 and the narrow-area cellular base station 50 (block B6).

When receiving the notification of rejection (instead of permission) of a communication between the data communication device 10 and the narrow-area cellular base station 50 via the low-frequency antenna 303 and the low-frequency wireless module 302, the communication setting device 30 displays on the display (not shown) in the communication setting device 30 that the communication setting (initial setting) to be performed at the time of installation of the data communication setting device 10 has not ended normally, and then processing ends.

Figure 4:
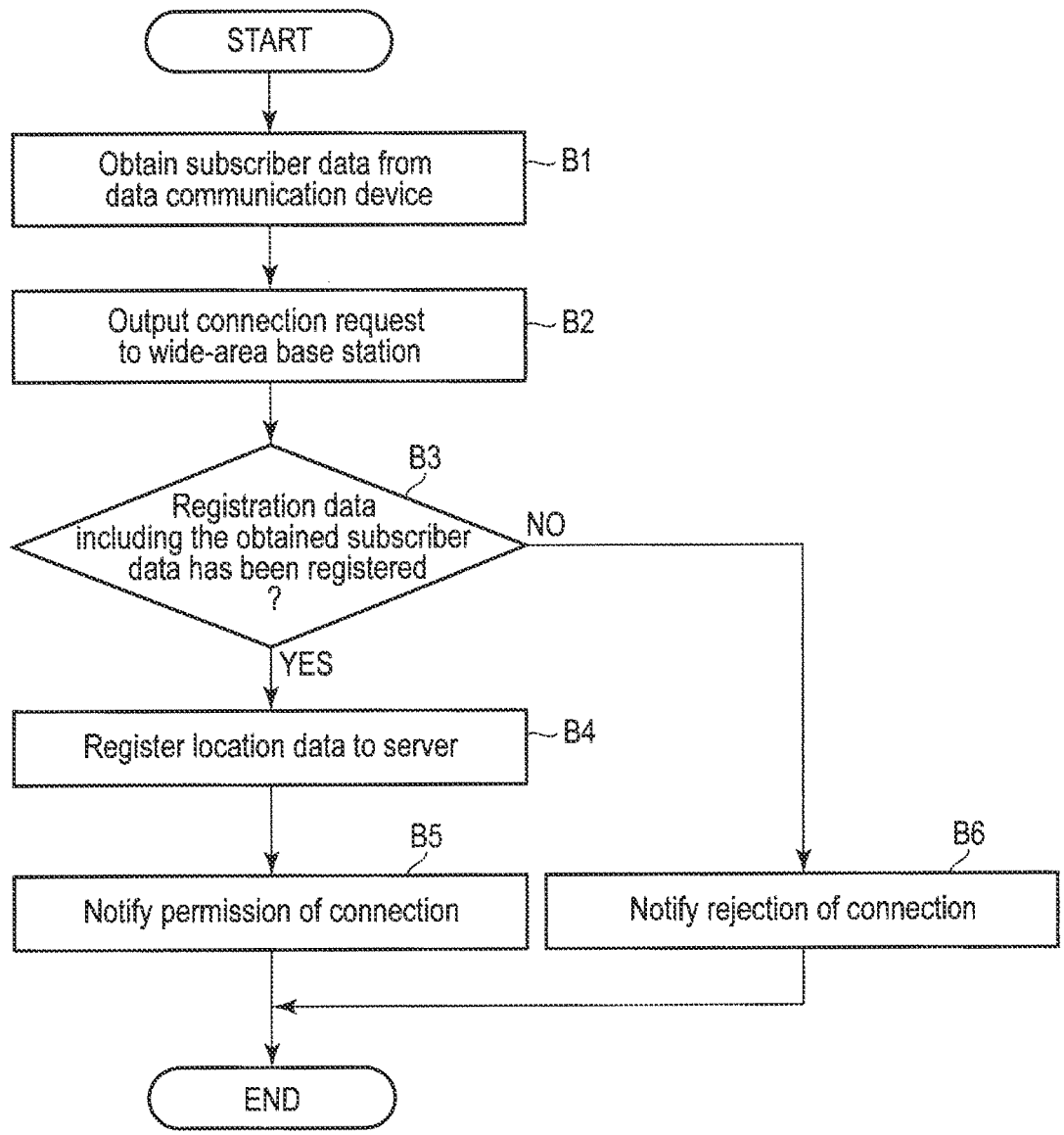
FIG. 4 is a flowchart showing an example of the procedure of the communication setting processing of the embodiment.

Note that the communication device 30 will be detached from the data communication device 10 after the execution of the above-described communication setting processing of FIG. 4.

Next, with reference to FIGS. 5 and 6, an example of the procedure of data communication processing to be executed after the above-described communication setting processing ends normally will be described. The following description is based on the assumption that the administrator of the data communication device 10 has made the above-described connection request to the data communication device 10 at a location within the range that a wireless communication can be established with the wide-area cellular base station 40. Further, as shown in FIG. 5, the following description is based also on the assumption that the administrator has made the connection request to the data communication device 10 from a communication device 70 conforming to 4G cellular systems which the administrator carries with him or her.

First, the communication device 70 carried by the administrator outputs a connection request for access to the data communication device 10 to the wide-area cellular base station 40, the wireless communication range of which includes the current location of the administrator (block B11). Note that the connection request includes the subscriber data unique to the data communication device 10.

When receiving the connection request output from the communication device 70, the wide-area cellular base station 40 requests the server 60 to execute processing (confirmation processing) to confirm the location data associated with the subscriber data included in the connection request (block B12). Note that, after executing the above-described confirmation processing, the server 60 notifies the wide-area cellular base station 40 that there has been a connection request for access to the data communication device 10.

The wide-area cellular base station 40 instructs the narrow-area cellular base station 50 installed in the range that wireless communication can be established with the data communication device 10 to call the data communication device 10 (block B13).

When receiving the instruction from the wide-area cellular base station 40, the narrow-area cellular base station 50 executes processing to call the data communication device 10 based on the instruction (block B14). When called by the narrow-area cellular base station 50, the data communication device 10 outputs to the narrow-area cellular base station 50 a notification that the data communication device 10 can respond to the call (block B15).

When receiving the notification from the data communication device 10 of being able to respond, the narrow-area cellular base station 50 selects a wireless channel to be used for data communication, establishes a connection between the narrow-area cellular base station 50 and the data communication device 10, and starts data communication (block B16). Note that various kinds of data obtained by the data communication is then transmitted to the communication device 70 carried by the administrator via the wide-area cellular base station 40.

According to the above-described data communication, the administrator can obtain, for example, data recorded in the data communication device 10 (more specifically, video data which has been recorded until now or the like in a case where the data communication device 10 is a security camera) at higher speed than the case of obtaining the data using 4G cellular systems.

Figure 7:
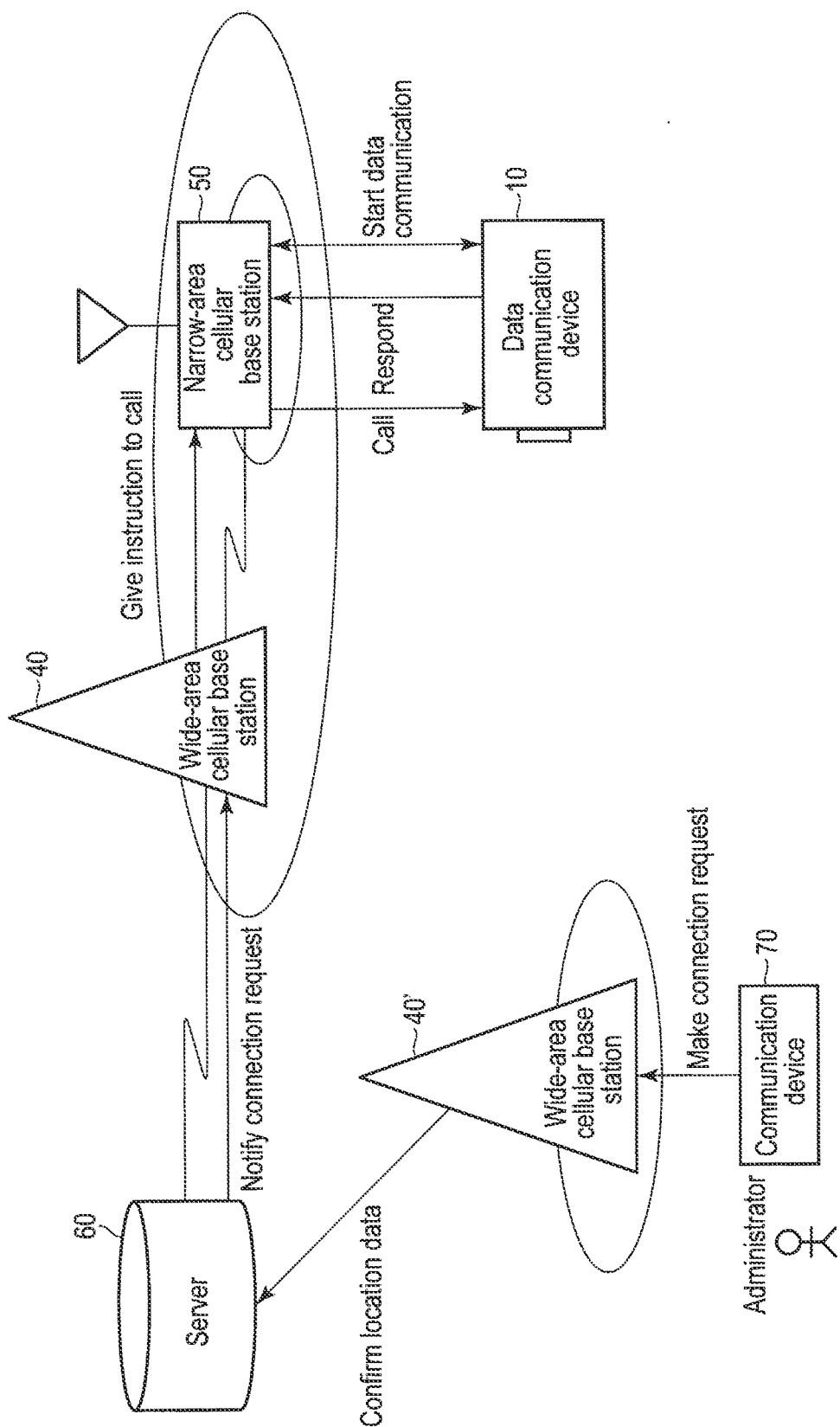
FIG. 7 is a supplementary explanatory diagram showing another example of the procedure of the data communication processing of the embodiment.
Figure 8:
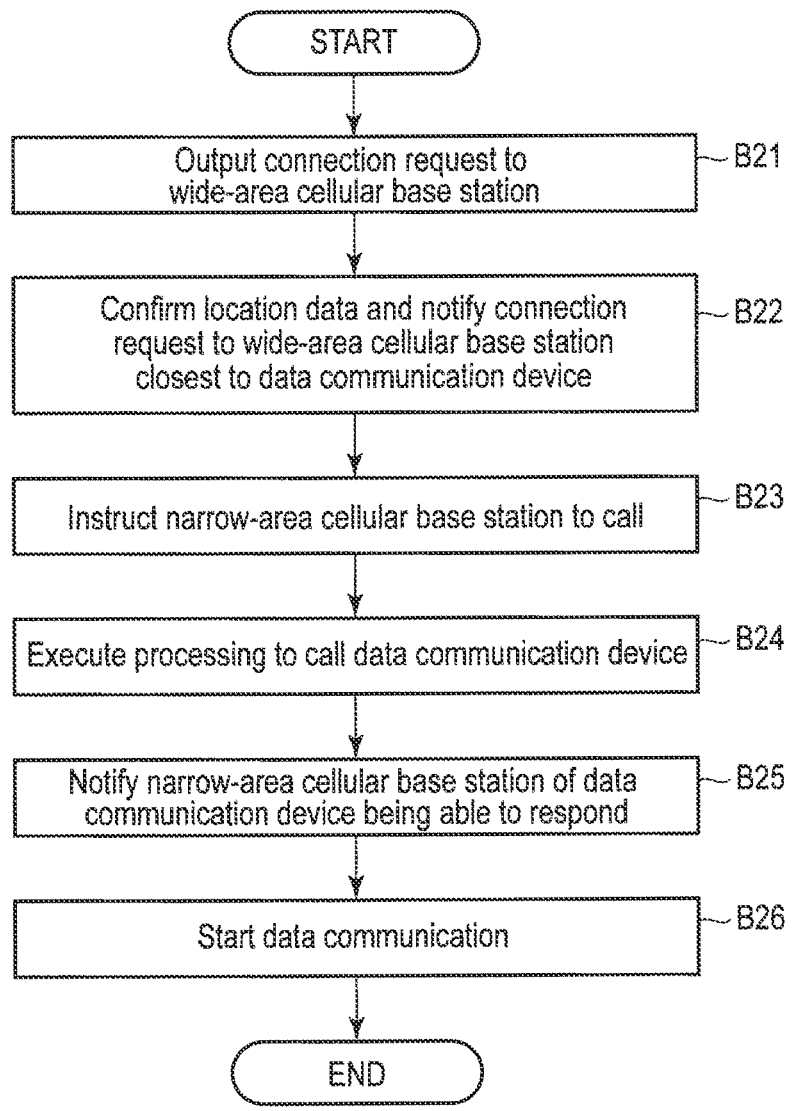
FIG. 8 is a flowchart showing another example of the procedure of the data communication processing of the embodiment.

Next, with reference to FIGS. 7 and 8, another example of the procedure of the data communication processing to be executed after the above-described communication setting processing ends normally will be described. The following description is based on the assumption that the administrator of the data communication device 10 has made a connection request to the data communication device 10 at a location outside the range that wireless communication can be established with the wide-area cellular base station 40. Further, as shown in FIG. 7, the following description is based also on the assumption that the administrator has made the connection request to the data communication device 10 from the communication device 70 conforming to 4G cellular systems which the administrator carries with him or her.

First, the communication device 70 carried by the administrator outputs a connection request for access to the data communication device 10 to a wide-area cellular base station 40', the wireless communication range of which includes the current location of the administrator (block B21). Note that the connection request includes the subscriber data unique to the data communication device 10.

When receiving the connection request output from the communication device 70, the wide-area cellular base station 40' requests the server 60 to execute processing (confirmation processing) to confirm the location data associated with the subscriber data included in the connection request (block B22). Note that, after executing the above-described confirmation processing, the server 60 notifies the wide-area cellular base station 40 closest to the installation location of the data communication device 10 which is indicated by the location data associated with the subscriber data included in the connection request that there has been a connection request for access to the data communication device 10.

Figure 6:
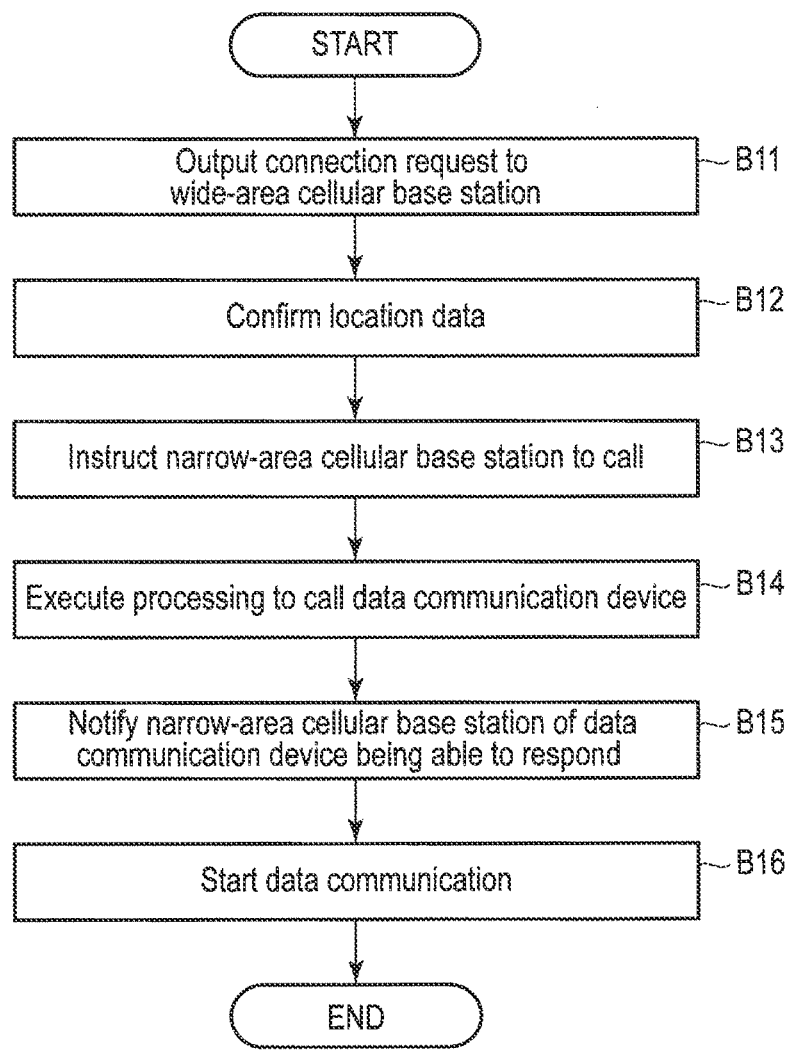
FIG. 6 is a flowchart showing an example of the procedure of the data communication processing of the embodiment.

Subsequent processing in blocks B23 to B26 are similar to the processing in blocks B13 to B16 of FIG. 6 and thus detailed description thereof will be omitted.

According to the above-described embodiment, the data communication device 10 has a structure conforming only to 5G cellular systems as well as a structure detachably connectable to the communication setting device 30 conforming to 4G cellular systems. Therefore, the data communication device 10 is compatible with 4G cellular systems as well as 5G cellular systems, and since the data communication device 10 is not required to include both a structure conforming to the 4G cellular systems and a structure conforming to the 5G cellular systems, it is possible to prevent an increase in the circuit scale (device size). Further, as described above, the data communication device 10 only needs to include the structure conforming to 5G cellular systems, and therefore it is possible to reduce the power consumption and the manufacturing cost as compared to those of the case of including both the structure conforming to the 4G cellular systems and the structure conforming to the 5G cellular systems.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device configured to perform a communication with a communication system which includes
    a server configured to store identification data for identifying the electronic device,
    a first wide-area cellular base station conforming to a low-frequency band,
    a first communication device configured to perform a wireless communication with the first wide-area cellular base station, and
    a narrow-area cellular base station conforming to a high-frequency band,
    the electronic device comprising:
    a connecting portion configured to connect to the first communication device via a cable;
    a memory configured to store the identification data; and
    a controller configured to output the identification data stored in the memory to the first communication device via the connecting portion,
    wherein the controller is configured to:
    be set, when authentication processing using the output identification data is executed between the first communication device, the first wide-area cellular base station and the server and when authentication by the authentication processing succeeds, to a state of being able to perform a communication with the narrow-area cellular base station which receives a call instruction from the first wide-area cellular base station,
    maintain the state of being able to perform a communication even after the first communication device connected to the connecting portion via the cable is detached from the connecting portion, and
    perform a data communication with the first communication device which is no longer connected to the connecting portion via the cable, via the narrow-area cellular base station and the first wide-area cellular base station.

2. The electronic device of claim 1, wherein the memory is a SIM card, and
    the first communication device does not comprise the SIM card.

3. The electronic device of claim 1, wherein the controller is configured, when a second wide-area cellular base station and a second communication device configured to perform a communication with the second wide-area cellular base station is connected to the communication system and when authentication processing between the second communication device and the server succeeds, to perform a data communication with the second communication device via the narrow-area cellular base station, the first wide-area cellular base station, and the second wide-area cellular base station.

* * * * *